(12) United States Patent
Colosi (10) Patent No.: US 8,224,923 B2
(45) Date of Patent: Jul. 17, 2012

(54) CHARACTERIZING UNREGISTERED DOMAIN NAMES

(75) Inventor: John Colosi, Dulles, VA (US)

(73) Assignee: Verisign, Inc., Reston, VA (US)

( * ) Notice: Subject to any disclaimer, the term of this patent is extended or adjusted under 35 U.S.C. 154(b) by 326 days.

(21) Appl. No.: 12/489,381

(22) Filed: Jun. 22, 2009

(65) Prior Publication Data

US 2010/0325250 A1    Dec. 23, 2010

(51) Int. Cl.
G06F 15/16 (2006.01)
G06F 7/00 (2006.01)
G06F 17/30 (2006.01)

(52) U.S. Cl. .......................................... 709/217; 707/727
(58) Field of Classification Search .................. 709/217; 707/727

See application file for complete search history.

(56) References Cited

U.S. PATENT DOCUMENTS

| | | | |
|---|---|---|---|
| 6,804,701 B2 | 10/2004 | Muret et al. | |
| 7,136,932 B1 | 11/2006 | Schneider | |
| 7,472,160 B2* | 12/2008 | King et al. | 709/203 |
| 2004/0199493 A1* | 10/2004 | Ruiz et al. | 707/3 |
| 2005/0210042 A1* | 9/2005 | Goedken | 707/100 |
| 2006/0004784 A1* | 1/2006 | Ableman et al. | 707/100 |
| 2006/0095459 A1 | 5/2006 | Adelman et al. | |
| 2007/0027865 A1 | 2/2007 | Bartz et al. | |
| 2007/0214284 A1* | 9/2007 | King et al. | 709/245 |
| 2007/0299967 A1 | 12/2007 | Brady | |
| 2008/0016233 A1 | 1/2008 | Schneider | |
| 2008/0059348 A1* | 3/2008 | Glassman et al. | 705/35 |
| 2008/0270203 A1* | 10/2008 | Holmes et al. | 705/7 |
| 2009/0254545 A1* | 10/2009 | Fisken | 707/5 |
| 2009/0282038 A1* | 11/2009 | Subotin et al. | 707/6 |
| 2010/0042622 A1* | 2/2010 | Matkowsky | 707/6 |
| 2010/0106731 A1* | 4/2010 | Cartmell et al. | 707/748 |
| 2010/0217842 A1* | 8/2010 | Shuster | 709/220 |
| 2010/0257266 A1* | 10/2010 | Holmes et al. | 709/224 |
| 2011/0087769 A1* | 4/2011 | Holmes et al. | 709/224 |
| 2011/0258237 A1* | 10/2011 | Thomas | 707/803 |

OTHER PUBLICATIONS

Go Daddy.com—Domain Name Appraisal; p. 1; Printed on Sep. 24, 2009; at URL:http://www.godaddy.com/gdshop/dna/appraisal.asp?isc=gtapp.
"Domain Name Appraisal and DNI Score"; p. 1; Printed on Sep. 24, 2009; at URL: http://www.afternic.com/rsample.html.
International Search Report for Application No. PCT/US10/39079 mailed on Aug. 10, 2010; 2 pages.
Written Opinion for Application No. PCT/US10/39079 mailed on Aug. 10, 2010; 9 pages.

* cited by examiner

*Primary Examiner* — George C Neurauter
(74) *Attorney, Agent, or Firm* — Finnegan, Henderson, Farabow, Garrett & Dunner, L.L.P.

(57) ABSTRACT

Methods and apparatus for characterizing unregistered domain names are provided. One embodiment includes obtaining a list of a plurality of resolution requests for the unregistered domain names, determining a number of occurrences of each of the unregistered domain names, computing a plurality of groupings based on the number of occurrences, and associating a score with each of the unregistered domain names.

29 Claims, 7 Drawing Sheets

FIG. 1

```
1241967663  edas1-chi2  LOSTBOUNDTRAIN.COM                67.15.238.64
1241967663  edas1-chi2  PWCINTERNAL.COM                   68.87.66.198
1241967663  edas1-chi2  PACIFICARE-CALIFORNIA-QUOTES.COM  65.55.238.58
1241967663  edas1-chi2  CITYMORE.COM                      218.108.244.226
1241967663  edas1-chi2  MVDEPXRESS.COM                    68.87.85.101
1241967663  edas1-chi2  BELLSOUTHN.NET                    69.16.234.109
1241967663  edas1-chi2  DEVIOUS-EXPOSURE.COM              207.164.234.193
1241967664  edas1-chi2  PEACHTREEDESSERTSCOMPANY.COM      68.87.68.164
1241967664  edas1-chi2  LOSTYOURPETS.COM                  67.15.238.64
1241967664  edas1-chi2  MANHATANSTEAKHOUSE.COM            70.80.36.186
```

FIG. 2

| Linear | | Range = 140 | |
|---|---|---|---|
| Score | Min. Counts | Max. Counts | Range of Counts | Number of Unregistered Domain Names |
| 1 | 1 | 140 | 140 | 27163 |
| 2 | 141 | 280 | 140 | 1479 |
| 3 | 281 | 420 | 140 | 672 |
| 4 | 421 | 560 | 140 | 194 |
| 5 | 561 | 700 | 140 | 218 |
| 6 | 701 | 840 | 140 | 109 |
| 7 | 841 | 980 | 140 | 37 |
| 8 | 981 | 1120 | 140 | 39 |
| 9 | 1121 | 1260 | 140 | 46 |
| 10 | 1261 | 1400 | 140 | 43 |

| Logarithmic | | | Base = 2.0635 | |
|---|---|---|---|---|
| Score | Min. Counts | Max. Counts | Range of Counts | Number of Unregistered Domain Names |
| 1 | 1 | 3 | 3 | 14012 |
| 2 | 4 | 8 | 5 | 3899 |
| 3 | 9 | 16 | 8 | 2557 |
| 4 | 17 | 30 | 14 | 2243 |
| 5 | 31 | 57 | 27 | 2080 |
| 6 | 58 | 107 | 50 | 1821 |
| 7 | 108 | 203 | 96 | 1610 |
| 8 | 204 | 385 | 182 | 1039 |
| 9 | 386 | 733 | 348 | 510 |
| 10 | 734 | 1400 | 667 | 229 |

| Linear / Log | | | Base = 2.8148 | |
|---|---|---|---|---|
| Score | Min. Counts | Max. Counts | Range of Counts | Number of Unregistered Domain Names |
| 1 | 1 | 1 | 1 | 9810 |
| 2 | 2 | 2 | 1 | 3246 |
| 3 | 3 | 3 | 1 | 956 |
| 4 | 4 | 7 | 4 | 3398 |
| 5 | 8 | 15 | 8 | 2798 |
| 6 | 16 | 34 | 19 | 2905 |
| 7 | 35 | 83 | 49 | 2793 |
| 8 | 84 | 209 | 126 | 2361 |
| 9 | 210 | 538 | 329 | 1209 |
| 10 | 539 | 1400 | 862 | 524 |

# CHARACTERIZING UNREGISTERED DOMAIN NAMES

BACKGROUND OF THE INVENTION

The Domain Name System (DNS) is the part of the Internet infrastructure that translates human-readable domain names into the Internet Protocol (IP) addresses needed to establish communications over the Internet. The DNS comprises DNS servers that run software permitting them to query DNS databases. The DNS databases contain records associating particular domain names with specific IP addresses. This allows users to refer to web sites and other resources using easier to remember domain names such as "example.com" rather than numeric IP addresses such as "123.4.56.78".

Each domain name is made up of a series of character strings (labels) separated by dots. The right-most label in a domain name is known as the "top-level domain" (TLD). Examples of well-known TLDs are ".com"; ".net"; and ".org.". Each TLD supports second-level domains that are located immediately to the left of the TLD (e.g., "example" in "www.example.com"). Each second-level domain can be followed by a third-level domain located immediately to the left of the second-level domain (e.g., "www" in "www.example.com"). There can be additional domain levels as well. For example, a domain with additional domain levels could be "www.photos.example.com".

A single IP address associated with a particular machine can support numerous domain names. That is, different domain names may resolve to the same server, and the server can determine what content to provide based on the requested domain name or additional non-domain information. Additional non-domain information may be included in a Uniform Resource Identifier (URI) structure that includes the domain name. For example, a "path" part is a sequence of segments separated by a forward slash ("/"). This information may be included immediately to the right of the domain name, such as "blog" in "www.example.com/blog", and may be used by a server or other receiving computer to identify and deliver specific content or run particular code. This information is often included in web page hyperlinks that navigate a user to another section of the web page or to a different web page.

Related domain names and content may be organized in an hierarchical manner, such as "www.example.com"; "www.blog.example.com"; "www.example.com/blog"; or "blog.example.com". Such related domain names need not share the same IP address. In this regard, part of the domain name may signify a particular server. For example "mail.example.com" and "www.example.com" may resolve to different servers with different functions despite the same second-level domain.

The Internet Corporation for Assigned Names and Numbers (ICANN) is responsible for managing the assignment of domain names and IP addresses. ICANN delegates the responsibility for operating the TLDs (including maintaining a registry of the second-level domains within the TLDs) to organizations known as a domain name registries. Registries are primarily responsible for converting domain names to IP addresses ("resolving") using DNS servers.

The actual registration of domain names is performed by companies referred to as domain name registrars. Registrars register domain names with the registries. For example, an end user (i.e., "registrant") goes through a registrar to register a domain name with a particular registry.

The registration of domain names is important because a domain name is the identifier by which an individual or entity (e.g., a company, a governmental agency, an educational institution, etc.) can be found on the Internet. Individuals and entities would like to have domain names that are easily remembered. For example, a word that is commonly associated with a particular person or company is generally preferred as a domain name because it is easier to remember. The number of words that are not yet registered as domain names, however, continues to decrease as the number of registered domain names increases. Most common words are already registered as domain names making it increasingly difficult to identify available words (i.e., unregistered domain names) that would be easy to remember and would serve as good domain names. Thus, there is a need in the art for methods and apparatus for characterizing unregistered domain names.

SUMMARY OF THE INVENTION

The present invention relates generally to Internet domain names. More specifically, the present invention relates to methods and apparatus for characterizing unregistered domain names using the number of resolution requests received for unregistered domain names. Merely by way of example, embodiments of the present invention provide methods for determining scores for unregistered domain names. Such scores may be used, for example, by registrants to identify valuable unregistered domain names. The scope of embodiments of the present invention is broader than this particular application, however, and can be applied to other applications utilizing characterizations of unregistered domain names.

According to an embodiment of the present invention, a method of characterizing unregistered domain names may include obtaining a list of a plurality of resolution requests for the unregistered domain names, determining a number of occurrences of each of the unregistered domain names, computing a plurality of groupings based on the number of occurrences, and associating a score with each of the unregistered domain names.

In one embodiment, a first portion of the groupings may be computed using a log-based method and a second portion of the groupings may be computed using a linear-based method. In another embodiment, the groupings may be computed using a log-based method.

In another embodiment, the score associated with each of the unregistered domain names is on a scale from 1 to 10. In yet another embodiment, the score associated with each of the unregistered domain names depends at least in part on the number of occurrences of each of the unregistered domain names.

According to another embodiment of the present invention, a method of providing information related to an unregistered domain name to a registrar includes receiving a plurality of resolution requests for unregistered domain names, forming a list of the plurality of resolution requests for the unregistered domain names, and determining a number of occurrences of the unregistered domain name in the list. The method also included receiving a request for the number of occurrences of the unregistered domain name and providing the number of occurrences of the unregistered domain name to the registrar.

Many benefits are achieved by way of the present invention over conventional techniques. For example, embodiments of the present invention provide methods and apparatus for providing real-time empirical information about unregistered domain names using the Domain Name System (DNS). This information includes the number of resolution requests (i.e., queries) submitted for particular unregistered domain names. This information can be used by registrants to identify valuable unregistered domain names. This information can also be used by registrars in selling unregistered domain names by providing relative values for unregistered domain names.

These and other embodiments of the present invention, along with many of its advantages and features, are described in more detail in conjunction with the text below and the attached figures.

DETAILED DESCRIPTION OF THE INVENTION

In accordance with embodiments of the present invention, methods and apparatus are provided for characterizing unregistered domain names. In a particular embodiment, a processing server is provided for determining a valuation score of an unregistered domain name using the number of resolution requests received for the unregistered domain name. The valuation score may be used to determine a relative value of a particular unregistered domain name in relation to a set of unregistered domain names.

Figure 1:
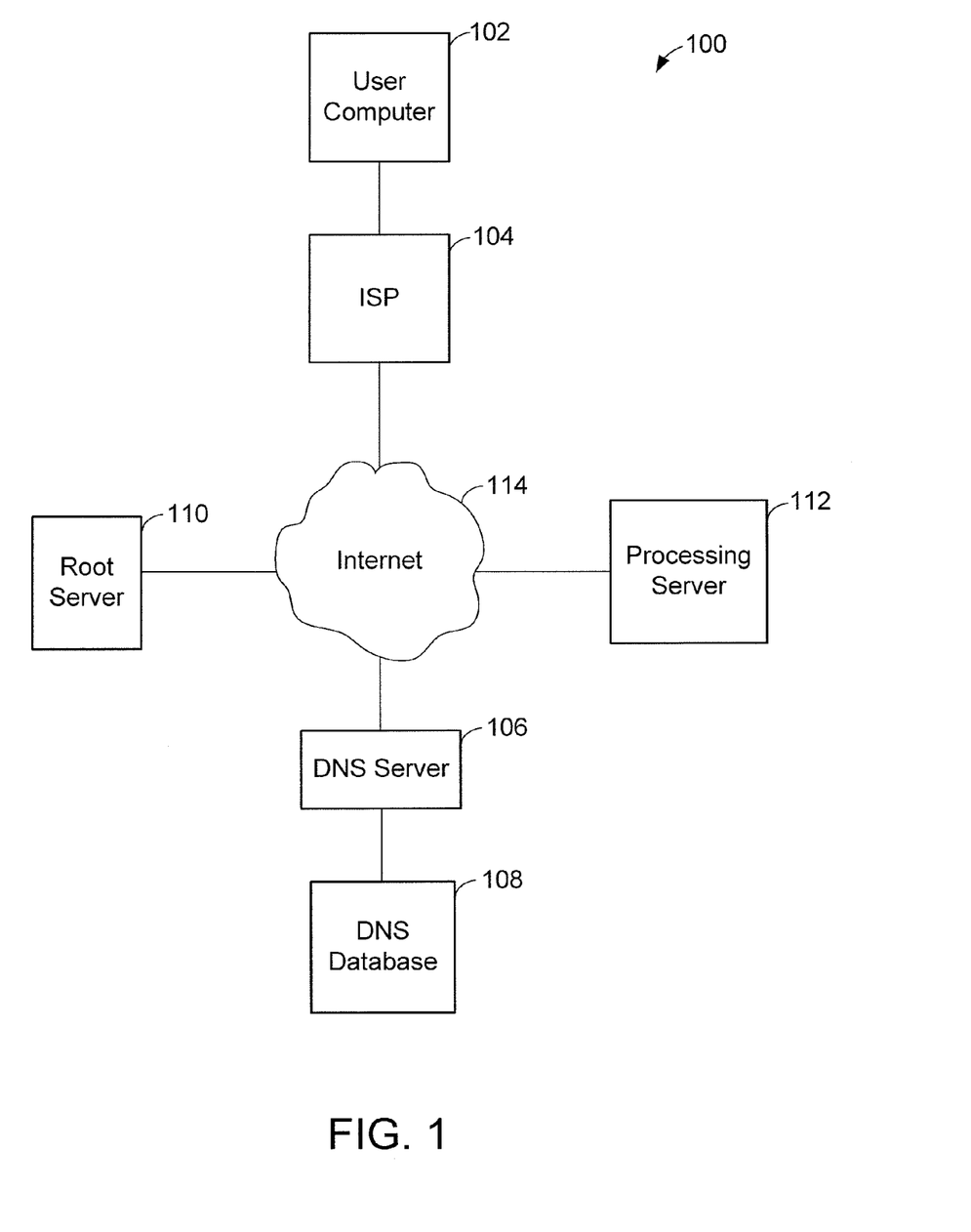
FIG. 1 is a simplified illustration of an exemplary system suitable for practicing embodiments of the present invention.

FIG. 1 is a simplified illustration of an exemplary system 100 suitable for practicing embodiments of the present invention. System 100 includes a user computer 102 connected to the Internet 114 via an Internet service provider (ISP) 104. A program such as a browser running on the user computer 102 provides an interface between a user and the Internet 114. The browser helps the user maneuver through sites on the Internet 114. The user establishes a connection to a site by inputting the domain name associated with the site into the browser. The browser initiates resolution of the domain name. As explained more fully below, if the domain name is registered, this results in obtaining an IP address associated with the site. If the domain name is unregistered, however, no IP address is associated with the domain name. In accordance with an embodiment of the present invention, this results in generation of a record that includes the unregistered domain name.

Resolution of domain names is performed by the DNS server 106. The DNS server 106 is connected to the Internet 114 and maps domain names to IP addresses. Although only one DNS server 106 is shown in system 100, there are many DNS servers distributed throughout the world. Each DNS server is responsible for the domain names registered to that DNS server. Each DNS server is associated with a database 108 containing the registered domain names, their corresponding IP addresses, and other information related to the domain names.

If the domain name requested is unknown to the DNS server 106, it can consult another DNS server or a root server 110 that can be selected from a group of root servers. Similar to the DNS server 106, there are many root servers distributed throughout the world. Each root server can handle a predetermined set of domain names based on their TLD. For example, there is a set of root servers responsible for handling all domain names with ".com" as their TLD. Another set of root servers is responsible for all domain names having ".org" as their TLD, and so on. For each domain name registered with a root server, the root server can identify which DNS server (or another root server) is responsible for the domain name. The root server may be configured to store a primary server and a number of backup servers that are responsible for resolving the requested domain name. The root server can transfer the request to the appropriate server, and an IP address can be returned to the user computer 102 for the domain name requested. A connection between the user computer 102 and the site associated with the domain name may then be established using the IP address.

If the domain name requested is unregistered it will be unknown to the root server 110. If the root server 110 is unable to identify a DNS server (or another root server) responsible for the domain name, the domain name will not be resolved and an appropriate message will be returned to the DNS server 106, the ISP 104, and/or the user computer 102. In accordance with an embodiment of the invention, a record is also generated that includes the unregistered domain name and other information related to the unresolved request. As used herein, such records will be referred to as non-existent domain (NX) records. NX records may be generated by the root server 110 or the DNS server 106 and stored in memory. For example, NX records may be appended to a file and stored in memory or the records may be stored in a database. As an example, an NX record may be generated by DNS server 106 and stored in DNS database 108. One of ordinary skill in the art would recognize many variations, modifications, or alternatives.

It is to be noted that the resolution process described above has been simplified for purposes of illustration and may involve additional intermediate servers not illustrated in FIG. 1 or described above.

Figure 2:
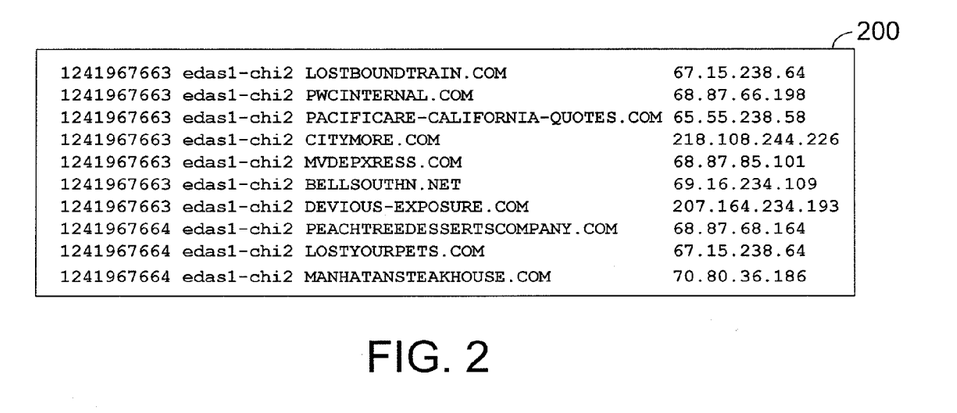
FIG. 2 is a list of non-existent (NX) records associated with resolution requests for unregistered domain names according to an embodiment of the present invention.

FIG. 2 is a list 200 of NX records associated with resolution requests for unregistered domain names according to an embodiment of the present invention. The list 200 illustrated in FIG. 2 includes a time stamp, an identifier associated with the server that generated the NX record, the unregistered domain name requested, and an identifier associated with the machine that generated the resolution request. Each of the information types are arranged in columns in the list 200 in FIG. 2. Embodiments of the invention are not limited to the particular information types shown in the example of FIG. 2, but may include more or fewer information types depending on the particular application.

The time stamp may be the time the resolution request was generated or the time the NX record was created. In the example of FIG. 2, the time stamp is the time the NX record was created and is in the format of the number of seconds elapsed since Jan. 1, 1970. Other formats may be used in accordance with embodiments of the invention.

The identifier associated with the server that generated the NX record may be a server name or a corresponding IP address. The example of FIG. 2 uses the server name (e.g., "edas1-chi2"). Other identifiers may also be used.

The list includes the unregistered domain name requested. For example, the list shown in FIG. 2 includes the domain names "LOSTBOUNDTRAIN.COM", "PWCINTERNAL.COM", "PACIFICARE-CALIFORNIA-QUOTES.COM", etc. As explained above, the domain names are unregistered and thus not associated with IP addresses.

The identifier associated with the machine that generated the resolution request may be a computer name or a corresponding IP address. Also, the machine that generated the resolution request may be the user computer 102 or the ISP 104. The example of FIG. 2 includes the IP address of the ISP 104 from which the resolution request was generated. For example, the unregistered domain name "LOSTBOUND-TRAIN.COM" was generated by the ISP 104 with an IP address of "67.15.238.64".

It is to be understood that the list 200 shown in FIG. 2 is provided merely as an example of the information types included in an exemplary NX record. NX records, however, are not so limited and may include information types that are different from those depicted in FIG. 2. For example, NX records may also include source and destination media access control (MAC) addresses that identify particular hardware, source and destination ports that identify internal machine facility used in data transport, sequence identifiers, flags, etc.

In accordance with an embodiment of the invention, the processing server 112 illustrated in FIG. 1 may receive the NX records from one or more servers and analyze the information provided by the NX records. For example, the NX records generated by the DNS server 106 and or the root server 108 may be sent to the processing server 112. In an embodiment, the NX records may be sent to the processing server 112 on a periodic basis, for example, every hour. Alternatively, the NX records may be sent to a database associated with the processing server 112. One of ordinary skill in the art would recognize many variations, modifications, or alternatives.

In an embodiment, processing server 112 may filter the NX records prior to analyzing the information they provide. As an example, the NX records may be filtered to remove records that are likely not human-generated, or alternatively, those records that are likely human-generated. One method of filtering records involves excluding records associated with resolution requests generated by the same machine. The same machine can be identified by the IP address, which is included in the list 200 shown in FIG. 2. Multiple resolution requests for unregistered domain names from the same machine may be an indication that they are machine rather than human generated.

Another method of filtering may involve excluding those requests from a particular machine that are generated with less than a specified period of time between requests. A machine may be more likely than a human to rapidly generate requests. The period of time may be determined based on the particular application.

Yet another method may include filtering requests with domain names that do or do not begin with "www". This method can also be used to filter machine generated requests because they may be more or less likely to begin with "www" than human-generated requests.

Other filter methods may be based upon any of the information types included in the NX records. For example, the time stamp may be used to filter records based on requests submitted during a particular time period or requests submitted during a particular time of day. The IP addresses of the machines generating the resolution requests may be used to filter records originating from a particular location. Other filters are contemplated and may be used depending on the particular application.

In an embodiment, the processing server 112 uses the NX records to compute the number of resolution requests submitted for each unregistered domain name in the list 200. This provides an NX record count for each of the unregistered domain names. For example, if the unregistered domain name "LOSTBOUNDTRAIN.COM" were to occur twice in a list of NX records, it would have an NX record count of two. The NX record counts can be used by the processing server 112 in characterizing the unregistered domain names.

Figure 3:
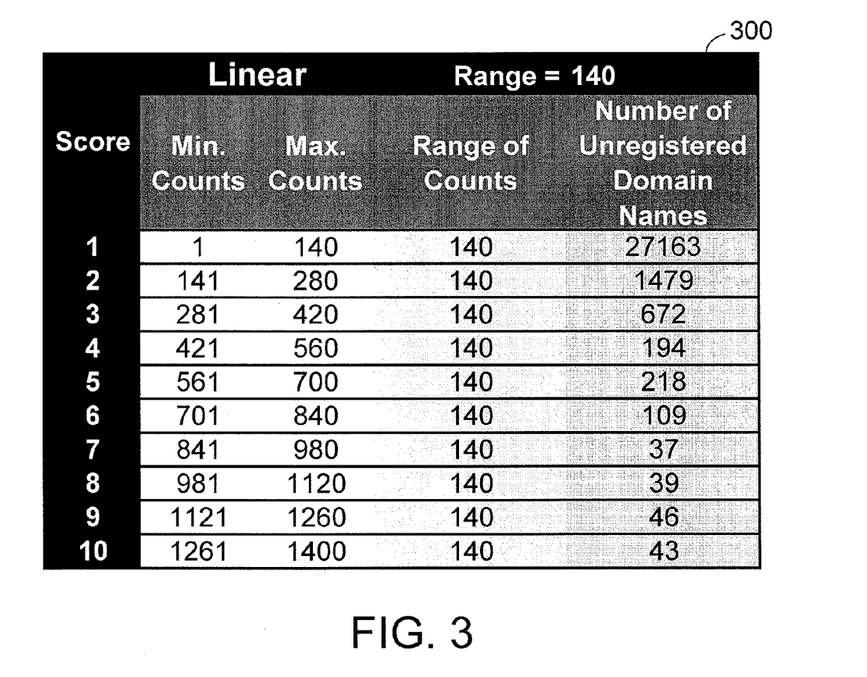
FIG. 3 is a table of valuation scores for unregistered domain names determined using a linear-based method according to embodiments of the present invention.
Figure 4:
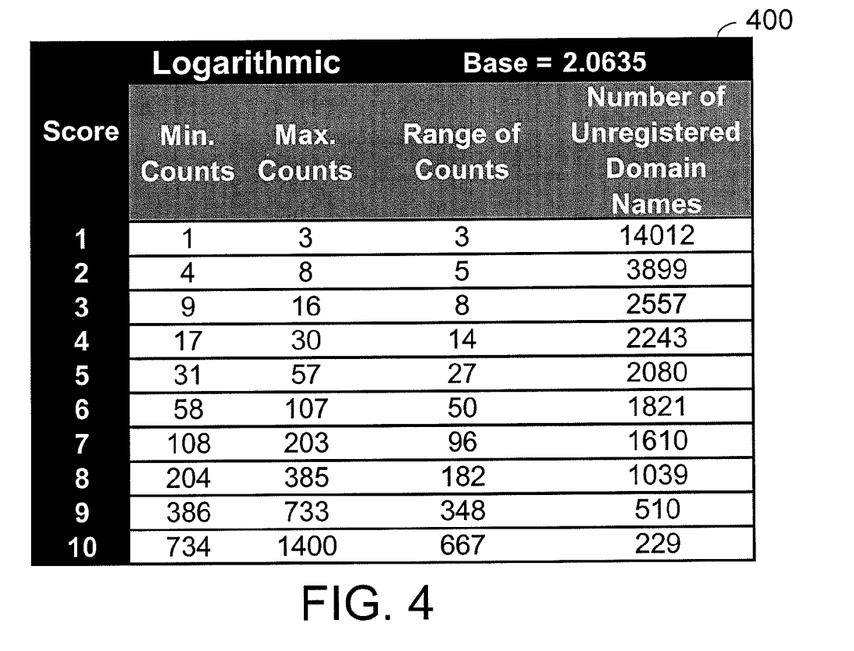
FIG. 4 is a table of valuation scores for unregistered domain names determined using a log-based method according to embodiments of the present invention.
Figure 5:
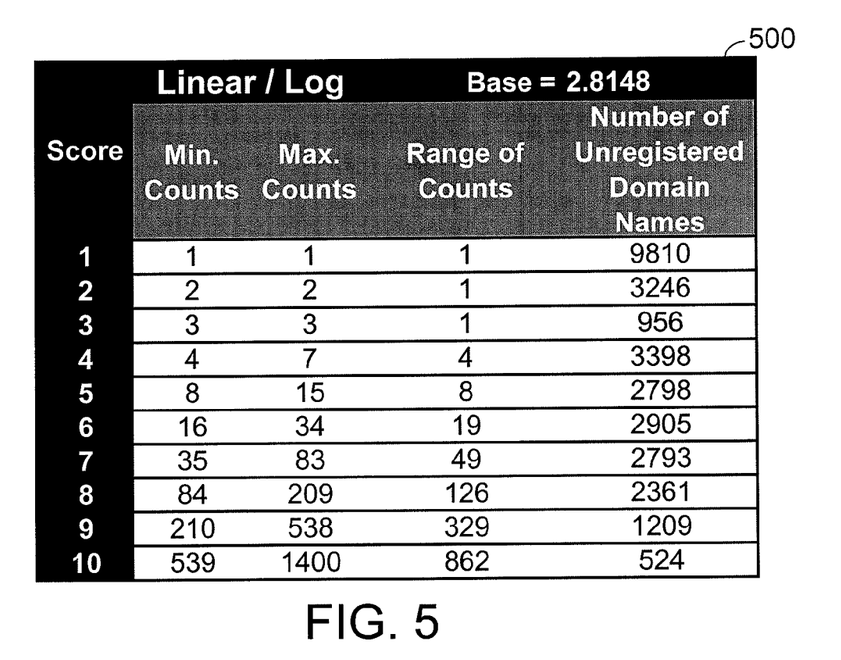
FIG. 5 is a table of valuation scores for unregistered domain names determined using a combination of linear and log-based methods according to embodiments of the present invention.

In accordance with embodiments of the present invention, NX record counts can be analyzed to provide valuation scores for unregistered domain names. As examples, FIGS. 3-5 show tables 300, 400, 500 with valuation scores determined using various methods in accordance with embodiments of the present invention. It is to be understood that the tables shown in FIGS. 3-5 are presented merely as examples and other methods may be used to analyze NX record counts in accordance with embodiments of the present invention. The methods used to determine the valuation scores in tables 300, 400, 500 establish groupings (or "buckets") of NX record counts associated with each valuation score. The valuation scores in tables 300, 400, 500 are on a scale from 1 to 10. In these examples, unregistered domain names with a valuation score of 10 have higher NX record counts than unregistered domain names with lower valuation scores. This provides valuation scores for each unregistered domain name relative to other unregistered domain names in the same list.

The linear-based method used in the example of FIG. 3 establishes groupings associated with each valuation score based on a fixed range of NX record counts. In FIG. 3 the range of NX record counts used is 140. Accordingly, unregistered domain names with an NX record count of between 1 and 140 are associated with a valuation score of 1, unregistered domain names with an NX record count of between 141 and 280 are associated with a valuation score of 2, unregistered domain names with an NX record count of between 281 and 420 are associated with a valuation score of 3, etc. The number of unregistered domain names in the list associated with each valuation score is shown in the far-right column. Other linear-based methods may be used in accordance with embodiments of the present invention.

FIG. 4 is a table of valuation scores for unregistered domain names determined using a log-based method according to embodiments of the present invention. Log-based methods can be used to provide groupings that distinguish between unregistered domain names with a small number of NX record counts. The log-based methods can be used to establish groupings that increase in size with valuation score. The increase from one grouping to the next can be determined using a log base. For example, the groupings in table 400 are determined using a log base of 2.0635. In an embodiment the log base can be determined using the following equation:

$$\text{Log Base} = (\text{Max. } N)^{(1/n)},$$

where Max. N is the highest number of NX record counts associated with an unregistered domain name in the list, and n is the number of valuation score levels. In table 400 the highest number of NX record counts associated with an unregistered domain name is 1400, and the number of valuation score levels is 10. Using the computed log base, the range of NX record counts for a particular valuation score can be computed using the following equation:

$$\text{Max. Count} = \text{Min. Count} + \text{Log Base}^{(\text{Valuation Score})},$$

where Max. Count and Min. Count define the range of NX record counts for the particular valuation score. Referring to table 400 as an example, the valuation score of 1 is associated with NX record counts ranging from Min. Count=1 to a Max. Count of $(1+2.0635^1)=3$ (rounded to the nearest whole number), valuation score 2 is associated with NX record counts ranging from Min. Count=4 to a Max. Count of $(4+2.0635^2)=8$, etc. In each case the Min. Count is the Max. Count from the previous valuation score level plus 1. The number of unregistered domain names in the list associated with each valuation score is shown in the far-right column. Other log-based methods may be used in accordance with embodiments of the present invention.

FIG. 5 is a table of valuation scores for unregistered domain names determined using a combination of linear and log-based methods according to an embodiment of the present invention. A combination of linear and log-based methods can be used to provide groupings that distinguish between unregistered domain names with a small number of NX record counts. The groupings used in table 500 include fixed ranges associated with some of the valuation scores and log-based ranges associated with other valuation scores. Referring to table 500 as an example, the groupings of NX record counts associated with valuation scores of 1 to 3 are determined using linear-based methods. For example, unregistered domain names with an NX record count of 1 are associated with a valuation score of 1, unregistered domain names with an NX record count of 2 are associated with a valuation score of 2, and unregistered domain names with an NX record count of 3 are associated with a valuation score of 3. The groupings of NX record counts associated with valuation scores of 4 to 10 are determined using log-based methods with a log base of 2.8148. The log base and the range of NX record counts for each valuation score can be computed as explained above with regard to FIG. 4. For example, the valuation score of 4 is associated with NX record counts ranging from Min. Count=4 to a Max. Count of $(4+2.8148^1)=7$ (rounded to the nearest whole number), the valuation score of 5 is associated with NX record counts ranging from Min. Count=8 to a Max. Count of $(8+2.8148^2)=15$, etc. In each case the Min. Count is the Max. Count from the previous valuation score level plus 1. As the number of unregistered domain names (far-right column) associated with each valuation score illustrates, a combination of linear and log-based methods can enable discernment between unregistered domain names with small differences in NX record counts.

Other information about unregistered domain names can also be included in the methods of determining valuation scores depending on the particular application. For example, the methods may include an analysis of the unregistered domain name considering characteristics such as the length of the word(s) in the unregistered domain name, the number of words in the unregistered domain name, the popularity of the words in the unregistered domain name, the similarity of the words in the unregistered domain name to other words, etc. The methods may also consider whether words in the unregistered domain name are registered in other TLDs, or if the unregistered domain name was previously registered and the length of the previous registration. Such information can be used in determining valuation scores in accordance with embodiments of the present invention. For example, some embodiments may assign a weighted value to the different information types in accordance with known techniques. One of ordinary skill in the art would recognize many variations, modifications, or alternatives.

Figure 6:
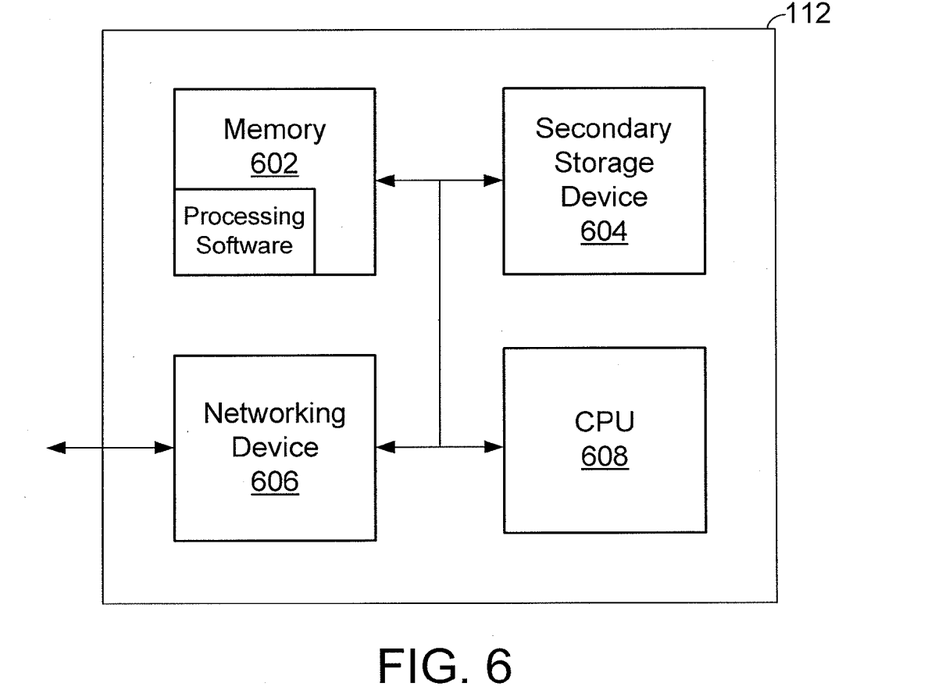
FIG. 6 is a simplified diagram of a processing server in accordance with an embodiment of the present invention.

FIG. 6 is a simplified diagram of a processing server 112 as depicted in FIG. 1 in accordance with an embodiment of the present invention. The exemplary processing server 112 illustrated in FIG. 6 includes memory 602, secondary storage device 604, one or more CPU's 608, and networking device 606. It is to be understood that a processing server according to embodiments of the present invention is not limited to these particular components, but may include other conventional hardware and/or software configurations.

Memory 602 may be configured to store information and instructions adapted to be executed by the CPU 608 to perform at least part of the methods in accordance with embodiments of the present invention. For example, memory 602 may include processing software with instructions for receiving NX records from the DNS server 106, the DNS database 108, or the root server 110. The processing software may also include instructions for computing NX record counts and determining valuation scores associated with unregistered domain names. Memory 602 may be local or remove to processing server 112. Memory 602 is not limited to a particular media type and may include any magnetic storage media, optical storage media, flash memory, and the like.

In some embodiments processing server 112 includes a secondary storage device 604. The secondary storage device 604 may be configured to receive and store NX records generated by the DNS server 106 and or the root server 110 as well as NX record counts and valuation scores associated with unregistered domain names. The secondary storage device 604 is not limited to a particular device, and may include any computer-readable storage media or conventional database such as those powered by MySQL, Oracle, Sybase, and the like, or another data source such as an LDAP server.

As illustrated in FIG. 6, the processing server 112 may include one or more CPU's 608. CPU's 608 are not limited and can be general purpose microprocessors configured to execute instructions and data, such as Pentium processors manufactured by the Intel Corporation of Santa Clara, Calif. It can also be an Application Specific Integrated Circuit (ASIC) that embodies at least part of the instructions for performing the method in accordance with the present invention in software, firmware and/or hardware. As an example, such processors include dedicated circuitry, ASICs, combinatorial logic, other programmable processors, combinations thereof, and the like.

The processing server 112 may also include one or more network devices 606. Network devices 606 may be configured to allow communication with other network devices such as user computer 102, ISP 104, DNS server 106, and root server 110 via Internet 114. Network devices 606 may support various network protocols, including, for example, Gigabit Ethernet (e.g., IEEE Standard 802.3), Fiber Channel (e.g., ANSI Standard X.3230), etc.

Although specific aspects and programs of processing server 112 have been described, one skilled in the art will appreciate that a processing server suitable for use with methods and systems consistent with the present invention may contain additional or different hardware and/or software. Thus, the processing server 112 is not limited to the exemplary configuration provided in FIG. 6 and described above.

Figure 7:
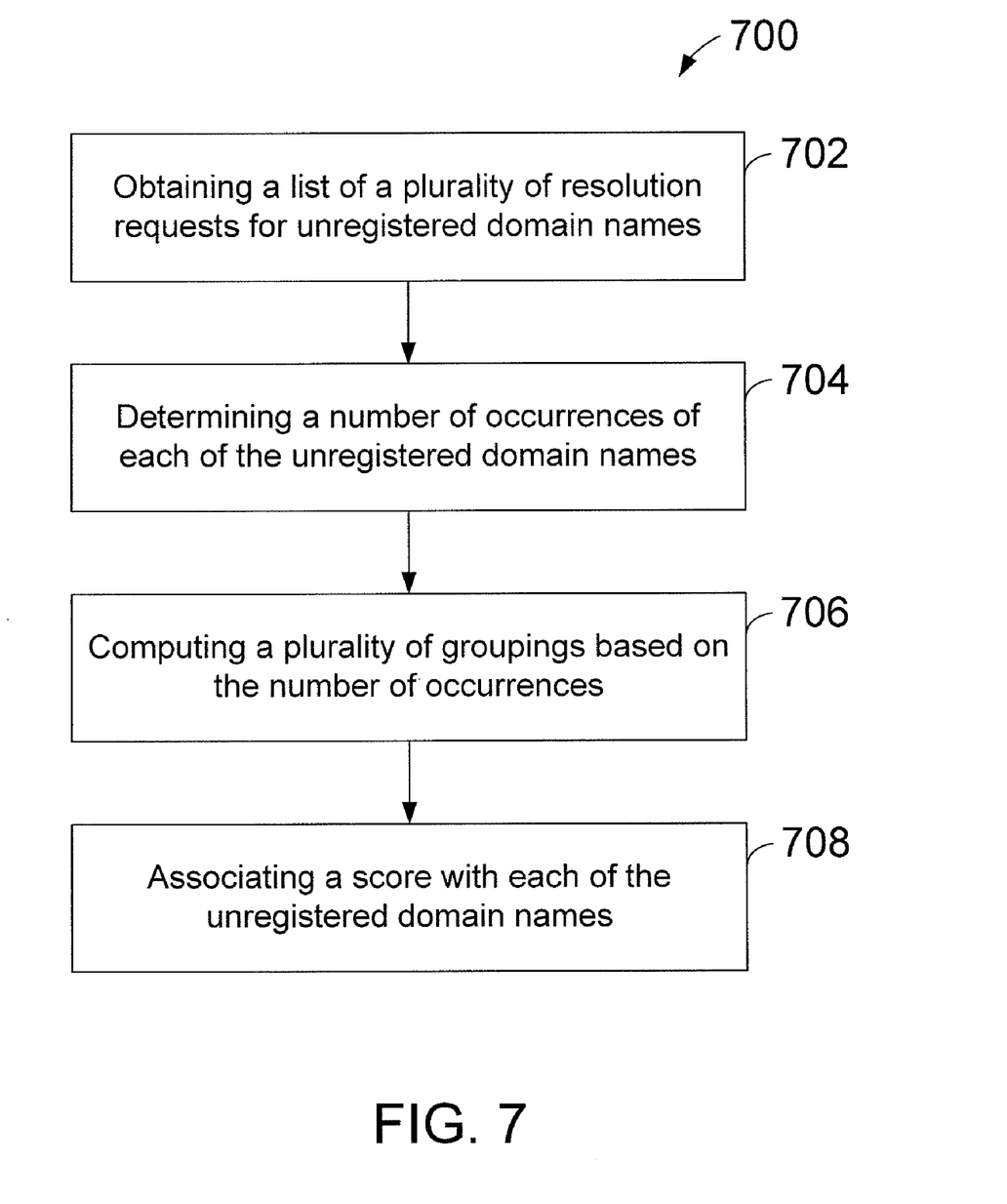
FIG. 7 is a simplified flowchart illustrating a method of characterizing unregistered domain names according to an embodiment of the present invention.

FIG. 7 is a simplified flowchart illustrating a method 700 of characterizing unregistered domain names according to an embodiment of the present invention. It should be understood that the following flowchart provides a particular method, and other sequences and steps may be performed in accordance with other embodiments of the invention. For example, the steps outlined below may be performed in a different order, and the individual steps may include multiple sub-steps that may be performed in various sequences as appropriate. Also, additional steps may be added or steps removed depending on the particular application. Thus, the scope the embodiments of the present invention is not limited to this specific method.

In step 702 a list of a plurality of resolution requests for the unregistered domain names is obtained. As explained above, the plurality of resolution requests may be NX records generated by DNS server 106 and/or root server 110. The NX records may include the unregistered domain name requested as well as other information associated with the request, such as a time stamp, an identifier associated with the server that generated the NX record, and an identifier associated with the machine that generated the resolution request.

Step 704 involves determining a number of occurrences of each of the unregistered domain names. As explained above, the number of occurrences of an unregistered domain name may be the NX record count for the unregistered domain name. The number of occurrences may be determined after filtering the plurality of resolution requests as explained above with regard to filtering NX records.

Step 706 involves computing a plurality of groupings based on the number of occurrences. As explained above, the NX record counts can be analyzed using various methods to determine a grouping of NX record counts associated with each score. This is illustrated, for example, in FIGS. 3-5, which show different groupings of NX record counts associated with each score depending on the method used.

In step 708, a score is associated with each of the unregistered domain names. The score may be determined based in part on the number of NX record counts. The score may also be based on other information such as the length of the word(s) in the unregistered domain name as described above.

Figure 8:
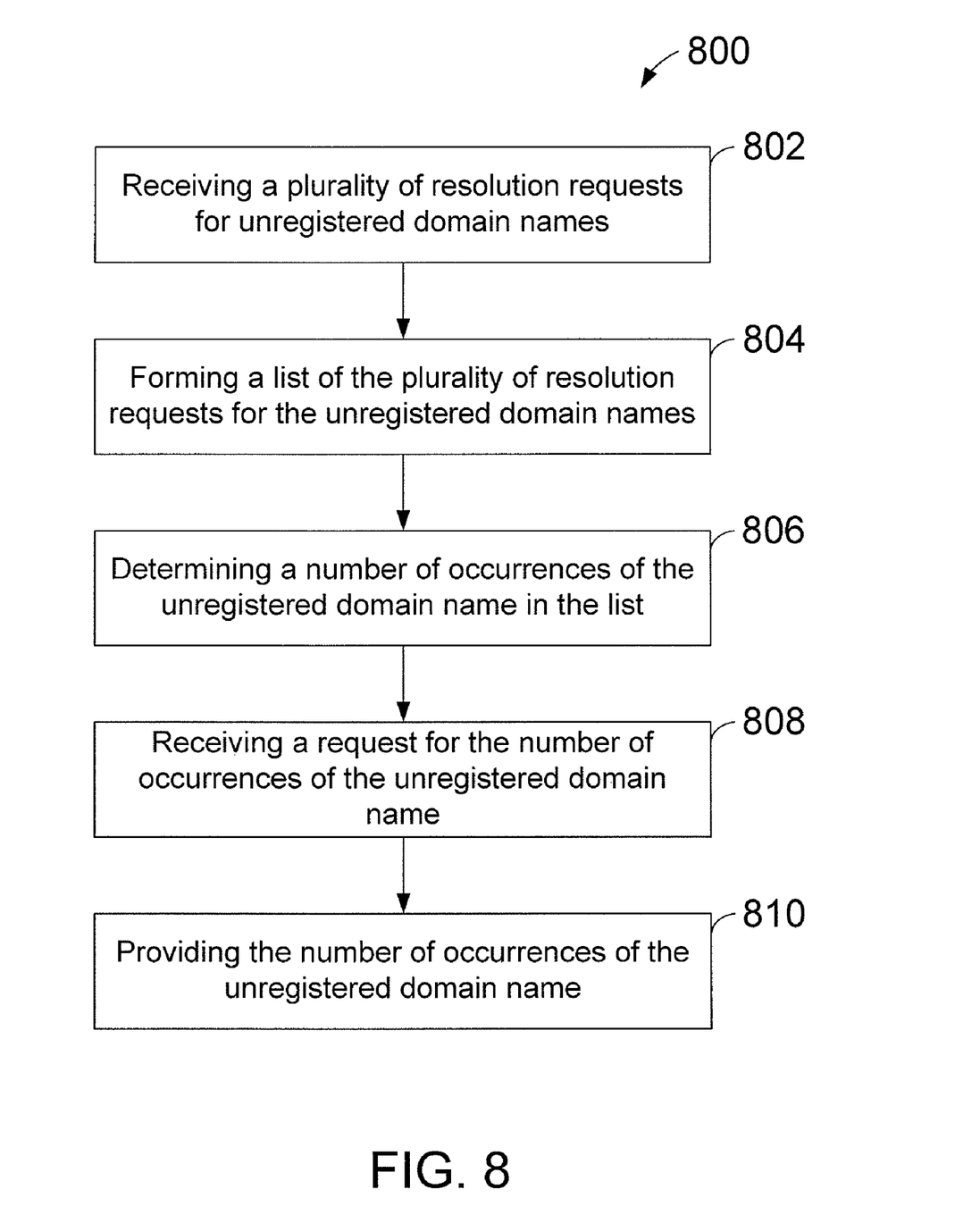
FIG. 8 is a simplified flowchart illustrating a method of determining a value of an unregistered domain name according to another embodiment of the present invention.

FIG. 8 is a simplified flowchart illustrating a method 800 of determining a value of an unregistered domain name according to another embodiment of the present invention. As mentioned above with regard to FIG. 7, the scope of the embodiments of the present invention is not limited to this specific method. Other sequences, steps, and sub-steps may be performed, and additional steps may be added or steps removed in accordance with embodiments of the present invention.

In step 802 a plurality of resolution requests for unregistered domain names is received. For example, a plurality of resolution requests for the unregistered domain names may be received by the DNS server 106 and/or the root server 110. In step 804 a list of the plurality of unregistered domain names is formed. The list may be formed by DNS server 106, DNS database 108, root server 110, and/or processing server 112. As an example, NX records generated by DNS server 106 may be saved as a list in DNS database 108. As another example, NX records received by processing server 112 may be compiled as a list.

Step 806 involves determining a number of occurrences of the unregistered domain name in the list for which the value is to be determined. In an embodiment, the number of occurrences of the unregistered domain name is the NX record count for the unregistered domain name. As explained above, the NX record count may be determined by processing server 112. Step 808 involves receiving a request for the number of occurrences of the unregistered domain name. As an example, a request may be received from a registrar for the number queries submitted for the unregistered domain name.

Step 810 involves providing the number of occurrences of the unregistered domain name. Continuing the example above, the number of occurrences of the unregistered domain name may be provided to the registrar submitting the request. As explained previously, this information may be used by the registrar to determine a value of the unregistered domain name.

Figure 9:
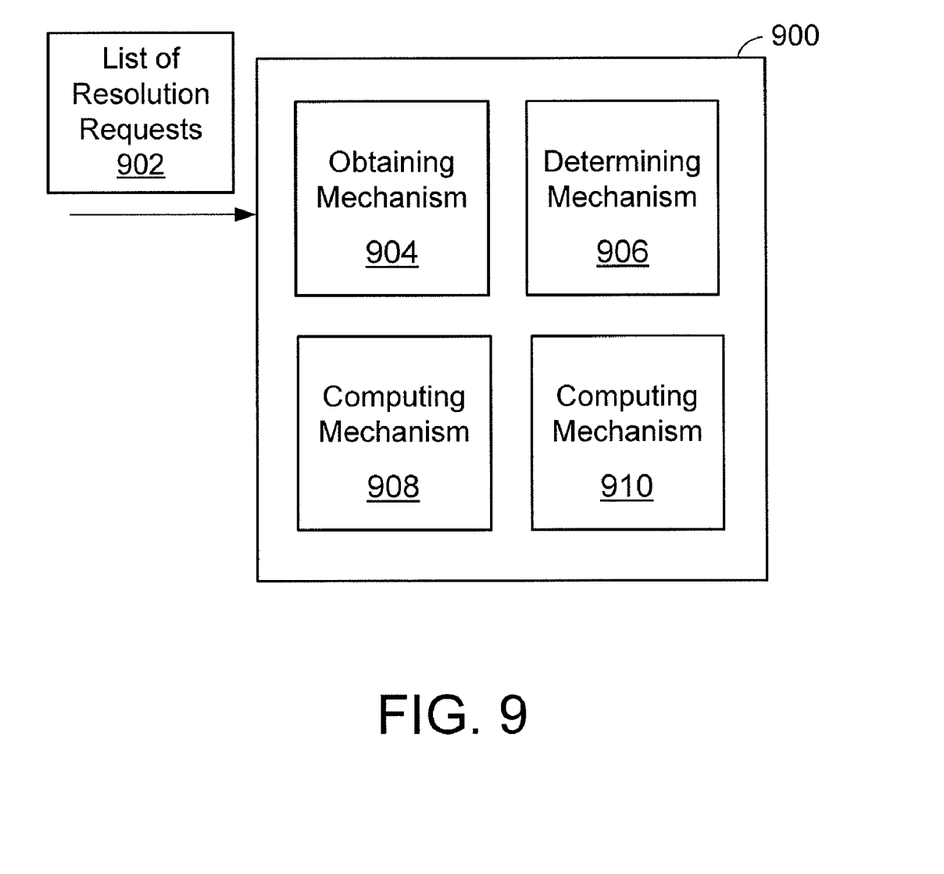
FIG. 9 is a simplified block diagram of a processing server architecture according to an embodiment of the present invention.

FIG. 9 is a simplified block diagram of an exemplary processing server architecture 900 according to an embodiment of the present invention. The processing server architecture 900 may include an obtaining mechanism 904 configured to obtain a list of resolution requests 902 for a plurality of unregistered domain names. For example, the list of resolution requests may include NX records associated unregistered domain names. The processing server architecture 900 may also include a determining mechanism 906 configured to determine the number of occurrences of unregistered domain names in the list. The processing server architecture 900 may also include a computing mechanism 908 configured to compute a plurality of groupings based on the number of occurrences. The processing server architecture 900 may also include an associating mechanism 910 configured to associate a score with each of the unregistered domain names. Each of the preceding mechanisms may be embodied, for example, in hardware or as a set of instructions embodied as code on a computer readable medium. One of ordinary skill in the art would recognize many variations, modifications, or alternatives.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A computer-implemented method of characterizing unregistered domain names performed by one or more processors, the method comprising:
   obtaining a list of a plurality of resolution requests for a plurality of unregistered domain names, wherein each resolution request includes a timestamp field, a requesting-machine identifier field, and an unregistered domain name field;
   determining a number of occurrences of resolution requests for each of the plurality of unregistered domain names;
   computing a plurality of groupings based on the number of occurrences; and
   associating a score with each of the unregistered domain names.

2. The method of claim 1 wherein a first portion of the groupings are computed using a log-based method and a second portion of the groupings are computed using a linear-based method.

3. The method of claim 1 wherein the groupings are computed using a log-based method.

4. The method of claim 1 wherein the score associated with each of the unregistered domain names is on a scale from 1 to 10.

5. The method of claim 1 wherein the score associated with each of the unregistered domain names depends at least in part on the number of occurrences of each of the unregistered domain names.

6. The method of claim 1 wherein the number of occurrences of each of the unregistered domain names over a threshold value is reduced.

7. The method of claim 1 further comprising:
 determining a number of the plurality of resolution requests associated with a particular IP address; and
 reducing the number of the plurality of resolution requests associated with the particular IP address.

8. The method of claim 7 wherein the number of the plurality of resolution requests associated with the particular IP address is reduced to a threshold value.

9. The method of claim 1 wherein determining includes filtering the list of resolution requests based on at least the requesting-machine identifier field.

10. The method of claim 9 wherein filtering includes excluding resolution requests generated by the same machine.

11. The method of claim 1 wherein determining includes filtering the list of resolution requests based on at least the timestamp field.

12. The method of claim 11 wherein the filtering includes excluding requests generated within a specific period of time.

13. The method of claim 1 wherein determining includes filtering the list of resolution requests based on at least the unregistered domain name field.

14. The method of claim 13 wherein the filtering includes filtering requests based on whether the unregistered domain name begins with "www".

15. The method of claim 1 wherein determining includes filtering the list of resolution requests based on the geographic location of the requesting machine.

16. The method of claim 1 wherein determining includes determining whether the resolution request was likely human generated.

17. A computer-implemented apparatus capable of characterizing unregistered domain names, comprising:
 a processing system, comprising one or more processors;
 a memory containing instructions for execution by the processing system;
 an obtaining mechanism configured to obtain a list of a plurality of resolution requests for a plurality of unregistered domain names, wherein each resolution request includes a timestamp field, a requesting-machine identifier field, and an unregistered domain name field;
 a determining mechanism configured to determine a number of occurrences of resolution requests for each of the unregistered domain names;
 a computing mechanism configured to compute a plurality of groupings based on the number of occurrences; and
 an associating mechanism configured to associate a score with each of the unregistered domain names.

18. The apparatus of claim 17 wherein a first portion of the groupings are computed using a log-based method and a second portion of the groupings are computed using a linear-based method.

19. The apparatus of claim 17 wherein the groupings are computed using a log-based method.

20. The apparatus of claim 17 wherein the score associated with each of the unregistered domain names is on a scale from 1 to 10.

21. The apparatus of claim 17 wherein the determining mechanism is further configured to reduce the number of occurrences of resolution requests for each of the unregistered domain names over a threshold value.

22. The apparatus of claim 17 further comprising:
 a second determining mechanism configured to determine a number of the plurality of resolution requests associated with a particular IP address; and
 a reducing mechanism configured to reduce the number of the plurality of resolution requests associated with the particular IP address.

23. A non-transitory computer readable medium including computer program code for characterizing unregistered domain names, the computer readable medium comprising:
 code for obtaining a list of a plurality of resolution requests for a plurality of unregistered domain names, wherein each resolution request includes a timestamp field, a requesting-machine identifier field, and an unregistered domain name field;
 code for determining a number of occurrences of resolution requests for each of the unregistered domain names;
 code for computing a plurality of groupings based on the number of occurrences; and
 code for associating a score with each of the unregistered domain names.

24. The computer readable medium of claim 23 wherein a first portion of the groupings are computed using a log-based method and a second portion of the groupings are computed using a linear-based method.

25. The computer readable medium of claim 23 wherein the groupings are computed using a log-based method.

26. The computer readable medium of claim 23 wherein the score associated with each of the unregistered domain names is on a scale from 1 to 10.

27. The computer readable medium of claim 23 further comprising:
 code for determining a number of the plurality of resolution requests associated with a particular IP address; and
 code for reducing the number of the plurality of resolution requests associated with the particular IP address.

28. The computer readable medium of claim 23 further comprising:
 code for reducing the number of occurrences of each of the unregistered domain names over a threshold value.

29. A computer-implemented method of characterizing unregistered domain names performed by one or more processors, the method comprising:
 obtaining a list of a plurality of resolution requests for a plurality of unregistered domain names, wherein each resolution request includes a timestamp field, a requesting-machine identifier field, and an unregistered domain name field;
 determining a number of occurrences of each of the plurality of unregistered domain names by filtering the list of resolution requests at least based on the requesting-machine identifier;
 computing a plurality of groupings based on the number of occurrences, wherein at least some of the plurality of groups are computed using a log-based method; and
 associating a score with each of the unregistered domain names based at least on the groupings.

* * * * *